United States Patent [19]
Kiser

[11] 3,743,237
[45] July 3, 1973

[54] DIAPHRAGM ACTUATED VALVE

[76] Inventor: Elmer P. Kiser, 1531 Main Street, Napa, Calif.

[22] Filed: Dec. 30, 1971

[21] Appl. No.: 214,080

[52] U.S. Cl.................................. 251/25, 251/61.5
[51] Int. Cl.......................................... F16k 31/145
[58] Field of Search..................... 251/25, 61.5, 63.5

[56] References Cited
UNITED STATES PATENTS

| | | | |
|---|---|---|---|
| 2,966,172 | 12/1960 | Smith............................. | 251/61.5 X |
| 3,502,297 | 3/1970 | Wardrup.............................. | 251/25 |
| 2,675,204 | 4/1954 | Johnson.............................. | 251/25 |

Primary Examiner—Arnold Rosenthal
Attorney—George B. White

[57] ABSTRACT

A valve on a valve seat so located that the valve under pressure bears on the valve to keep it on the valve seat; the space above the valve has a solid divider and a dome forming an air chamber above the divider; the space in the dome being separated by a diaphragm which is connected to the valve by a valve stem slideable through the middle of the divider; a passage through the divider conducts air under pressure between the divider and the diaphragm to fill the chamber under the diaphragm and lift the diaphragm thereby to open the valve; the same passage functions as a vent when the valve is closed with the assistance of a spring in the dome above the diaphragm; the air in the hose connected to the passage in the divider is controlled to alternately admit air under pressure or to vent the air from the space between the diaphragm and the divider.

2 Claims, 2 Drawing Figures

Patented July 3, 1973  3,743,237
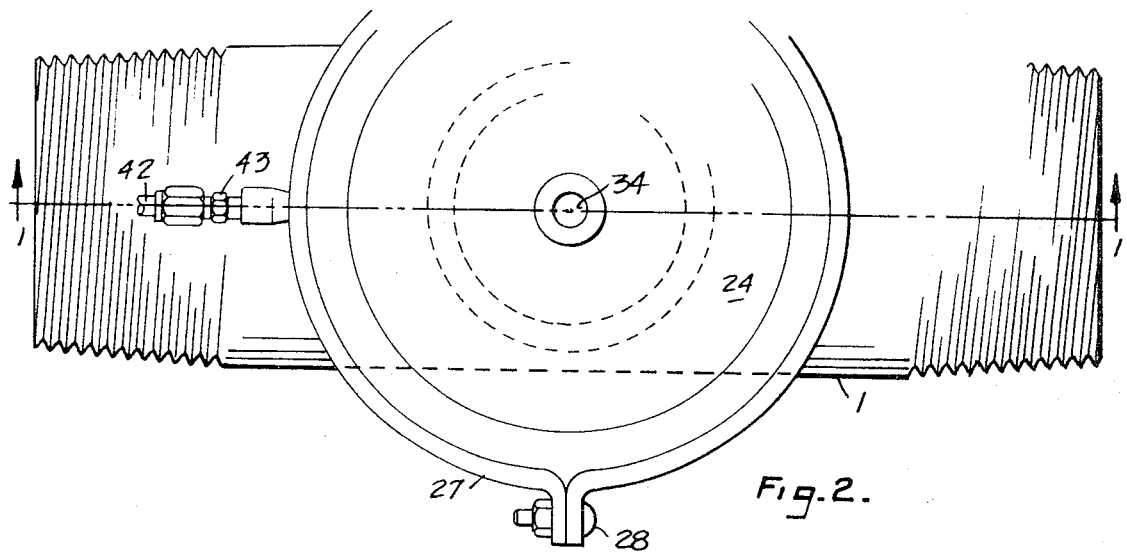
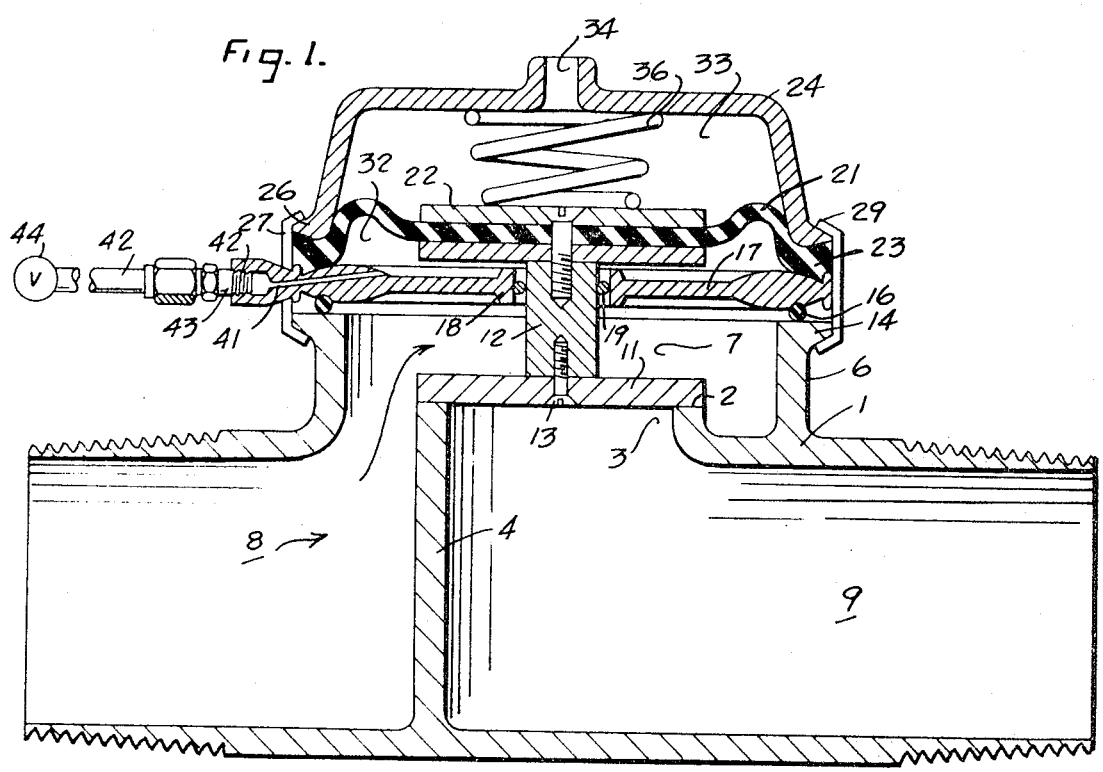
INVENTOR
ELMER P. KISER
BY George B. White

DIAPHRAGM ACTUATED VALVE

BACKGROUND OF THE INVENTION

The difficulty with valves for the delivery of fluids, particularly the type of valves used in tank trucks and the like, is leakage that may develop frequently, the lack of positive seating of the valve and the facility for quick opening for the delivery of liquid.

The primary object of the invention is to utilize the pressure of the fluid or liquid to firmly and positively seat the valve yet provide a speedy and consistent diaphragm actuated device for instantaneous opening of the valve at will and for almost instantaneous shutting off of the valve.

Another object of the invention is to provide a valve whereby the opening and closing of the valve can be controlled remotely if desired.

BRIEF DESCRIPTION OF THE DRAWINGS

FIG. 1 is a cross-sectional view of the valve.
FIG. 2 is a fragmental top plan view of the valve.

DETAILED DESCRIPTION

A valve body 1 has a horizontal valve seat 2 at the end of a vertical valve opening 3 adjacent a dividing wall 4 in the valve. A circular flange 6 is spaced from and surrounds the valve seat 2 so as to provide a pressure chamber 7 above the valve seat 2. The partition 4 is so located that the intake 8 of the valve body 1 is communicated under the flange 6 to the pressure chamber 7. Under the valve seat 2 and on the other side of the partition 4 is the outlet or discharge end 9 of the valve body 1. A valve 11 is seated on the valve seat 2 and has a valve stem 12 which, in this illustration, is secured by a suitable screw 13 to the valve 11.

The circular flange 6 terminates in an annular lip 14. On the top of the flange is a sealing ring 16 on which is seated a rigid divider 17. In the hub 18 of the divider 17 is another sealing ring 19. The valve stem 12 is reciprocable in the hub of the divider 17. A diaphragm 21 has a reinforced or stiff center portion 22 secured to the top of the valve stem 18. The periphery 23 of the diaphragm 21 is on the top of the peripheral portion of the divider 17. A cap or dome 24 has its lip 26 superimposed on the peripheral portion 23 of the diaphragm 21 and a circular clamp ring 27 held in clamping position by suitable screw and bolt 28 clamps the divider 17, the diaphragm periphery 23 and the dome lip 26 together on to the lip 14 of the valve body flange 6. For this purpose the clamping ring 27 has inwardly projecting flanges 29 overlapping the respective lips 14 and 26. The outer periphery of the divider 17 is shaped to form a dished surface for the diaphragm periphery 23, which latter is enlarged for firm holding of the diaphragm in place.

In this manner a chamber 32 is formed between the divider 17 and the diaphragm 21. A vent chamber 33 is formed in the dome 24 above the diaphragm 21 provided with a vent 34 to accommodate air expelled when the diaphragm 21 is moved for opening the valve. A coil spring 36 between the dome 24 and the middle portion 22 of the diaphragm 21 aids in returning the valve 11 into closed position. The strength of the spring 36 is determined to suit the pressure at the intake end of the valve.

The divider has a passage 41 extended from a coupling boss 42 on the outside to the chamber 32. A flexible hose 40 is connected by a suitable nipple or coupling 43 to the boss 42, and the hose 40 is controlled by a 2-way valve 44, which latter is connected to a supply of air under pressure.

In operation the valve 44 is turned so as to connect a compressed air supply to the hose 40. This compressed air fills the chamber 32 and lifts the diaphragm 21 so as to raise the valve 11 from the valve seat 2 and permit the flow of fluid or liquid through the valve. In order to shut off the valve the air valve 44 is turned to shut off the air supply and to open to the atmosphere thereby functioning as a vent from the chamber 32. The small passage 41 is so formed as to predetermine the rate of closing the valve thereby to allow positive and quick closing of the valve but prevent the slamming of the valve disk 11 onto the valve seat 2.

I claim:

1. In a diaphragm actuated valve,
a valve body having an intake and a discharge end, and a separator wall between the intake and the discharge end forming a valve seat,
an annular flange extended from the walls of said intake and discharge end spaced from the circumference of said valve seat so as to form a pressure chamber above the valve seat in communication with said intake end,
an enlarged outwardly extended head flange on the end of said annular flange,
a solid divider element on said head flange covering said pressure chamber,
a diaphragm spaced above said divider element to form an air chamber between said divider element and said diaphragm,
the outer circumference of said diaphragm resting on the outer circumference of said divider element,
a dome above said diaphragm having an annular flange overlying the outer peripheral portion of said diaphragm, and having an open air vent,
peripheral means to clamp said flange of said dome, the outer peripheral portion of said diaphragm and said divider element together onto said head flange,
a valve on said valve seat,
a valve stem connecting said valve to said diaphragm and being reciprocable through said divider element,
valve means to transmit air under pressure into said air chamber for raising said diaphragm and said valve away from said valve seat,
the outer periphery of said divider element having a metering passage extended from said air chamber outwardly,
coupling means on the outside of said divider element at the outer end of said metering passage for coupling said valve means to said metering passage,
said valve means when closed connecting said metering passage to the atmosphere thereby to control the rate of closing movement of said diaphragm and said valve to said valve seat.

2. The diaphragm actuated valve specified in claim 1, and resilient means in said dome element to urge said diaphragm toward said valve seat,
the middle portion of said diaphragm being reinforced to transmit the force of said resilient means to said valve stem.

* * * * *